W. G. BATE.
PIPE PATCH CLAMP.
APPLICATION FILED MAR. 8, 1912.

1,066,575.

Patented July 8, 1913.

Witnesses
E. B. Gilchrist
H. B. Sullivan

Inventor
Warwick G. Bate
by Thurston & Kivis
attorneys

UNITED STATES PATENT OFFICE.

WARWICK G. BATE, OF CLEVELAND, OHIO.

PIPE-PATCH CLAMP.

1,066,575.  Specification of Letters Patent.  Patented July 8, 1913.

Application filed March 8, 1912. Serial No. 682,550.

*To all whom it may concern:*

Be it known that I, WARWICK G. BATE, a citizen of the United States, residing at Cleveland, in the county of Cuyahoga and State of Ohio, have invented a certain new and useful Improvement in Pipe-Patch Clamps, of which the following is a full, clear, and exact description.

This invention is an improvement in the kind of pipe leak closers which are adapted to clamp a sheet of packing material onto the pipe and over the hole therein so as to close the same.

The invention has for its special object to provide such a device in a form such that its first cost is small and that the parts thereof when not in use may be so connected together as to occupy small space, and to insure that all of the parts thereof shall be at hand when they are required for use.

The invention consists in the combination substantially as shown of the two parts A and B having fingers which are adapted to interlock when the device is in use, and when out of use, and the set screw, all substantially as herein shown and described and pointed out definitely in the claims.

Figure 1:
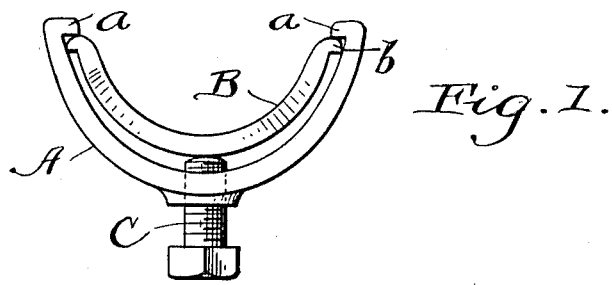
Figure 2:
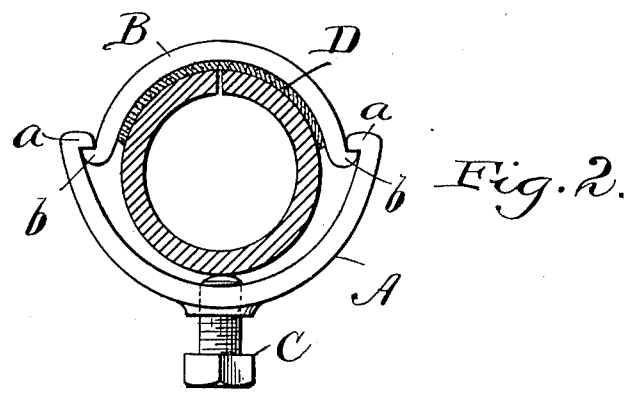
Figure 3:
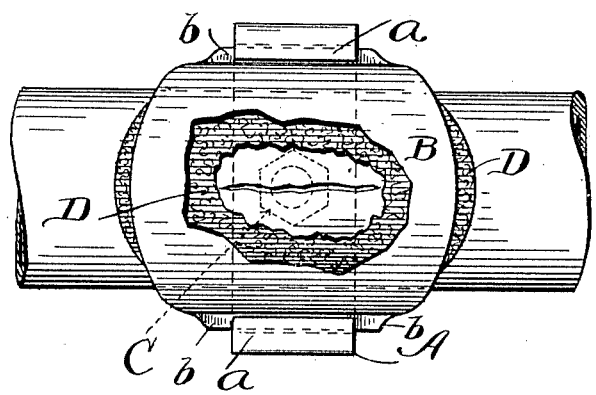

In the drawing, Figure 1 is an end view of the device showing the parts in the condition they will preferably occupy when the device is not in use. Fig. 2 is an end view showing the device in use upon a pipe which is sectioned. Fig. 3 is a plan view of the device as shown in Fig. 2.

Referring to the parts by letters, A and B represent two U-shaped clamping members. The larger member A has at its ends the inwardly turned fingers *a*. The smaller member B has at its ends the two outwardly turned fingers *b*. The shape and size of these two parts are such that the member B may be turned so that it may be nested within the member A with its fingers *b* beneath the fingers *a*.

C represents the set screw which screws through the middle part of the member A, and by pressing against the middle part of the member B, when the parts are nested as described, will hold them in the desired relation. When the parts have been so connected, the device occupies comparatively little space, and moreover all of the parts thereof will be together when they are required for use.

When it is desired to use the device to stop a leak in the pipe, the two members are separated and the smaller part B turned around. One member B goes over, and the other member A goes under the pipe, and the fingers *a* and *b* are interlocked as shown. A strip of packing material D is placed between the member B and the pipe; and the set screw C is turned in against the pipe with the result of securely fastening the device to the pipe, and securely holding the packing material over the leak in the pipe. The member B is preferably considerably wider than the member A, so that it may cover a considerable length of pipe over which a crack may extend.

Having described my invention, I claim:

The combination of a U-shaped clamping member A having at its ends inwardly turned fingers, and a set screw C which screws through the middle part of said member, and a smaller U-shaped clamping member B having outwardly extended fingers, said member B being of such size that when turned and nested within the member A the fingers *b* will pass under the fingers *a*, and the set screw may be screwed in against the member B to hold the parts together.

In testimony whereof, I hereunto affix my signature in the presence of two witnesses.

WARWICK G. BATE.

Witnesses:
E. L. THURSTON,
A. J. HUDSON.

---

Copies of this patent may be obtained for five cents each, by addressing the "Commissioner of Patents, Washington, D. C."